United States Patent [19]

Casler et al.

[11] 3,951,372
[45] Apr. 20, 1976

[54] THREE DIMENSIONAL CLAMP DEVICE

[75] Inventors: William A. Casler; Phillip E. Saurenman, both of Pasadena, Calif.

[73] Assignee: Clamp Mfg. Co., Inc., South El Monte, Calif.

[22] Filed: Nov. 29, 1974

[21] Appl. No.: 528,432

[52] U.S. Cl. .............................. 248/230; 403/385
[51] Int. Cl.² .......................................... A47B 96/06
[58] Field of Search ...................... 248/230, 226 A; 24/81 CC, 248 SA, 257; 403/385, 389, 391, 396; 339/225, 230, 263 R, 266, 245, 246, 248 R, 249 A

[56] References Cited
UNITED STATES PATENTS

| | | | |
|---|---|---|---|
| 1,103,749 | 7/1914 | Finkelstein | 339/248 R |
| 1,381,443 | 6/1921 | Woessner | 339/230 R |
| 1,455,441 | 5/1923 | Hodny | 248/230 |
| 1,937,612 | 12/1933 | Walde | 339/225 |
| 2,651,026 | 9/1953 | Roth | 339/246 |
| 3,627,339 | 12/1971 | Burneger | 248/230 |
| 3,651,449 | 3/1972 | Hall et al. | 339/266 R |

FOREIGN PATENTS OR APPLICATIONS

| | | | |
|---|---|---|---|
| 333,015 | 2/1921 | Germany | 339/249 R |

Primary Examiner—James T. McCall
Assistant Examiner—Robert A. Hafer
Attorney, Agent, or Firm—Donald D. Mon

[57] ABSTRACT

There is described a three dimensional clamp for holding a plurality of rod-like elements in various relative positions and angles. The clamp body has two opposed clamping sections aligned along a longitudinal axis and joined by an obliquely extending intermediate section or strip. The two opposed clamping sections have respective tongues extending along opposite sides of the intermediate strip but normally slightly spaced from the strip so that a clamping screw passing through both tongues and the intermediate strip draws the tongues toward each other and toward the strip, thereby reducing or warping the dimensions of the bore or hole in which the respective rod-like elements are inserted. In one embodiment the hole for one of the elements is fitted with a thimble rotatable in the hole which actually receives the element. When the clamping screw is tightened, the rod-like elements are gripped, one of them being gripped by the thimble. In an embodiment which does not incorporate a thimble the rod-like elements at each clamping section are gripped in a bore or hole of the section.

14 Claims, 17 Drawing Figures

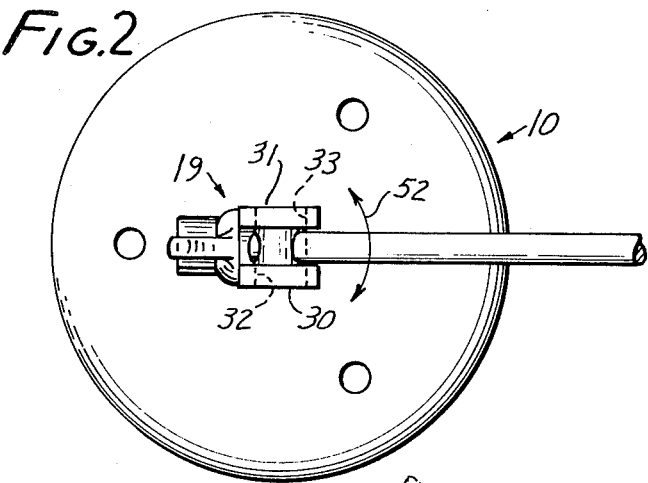
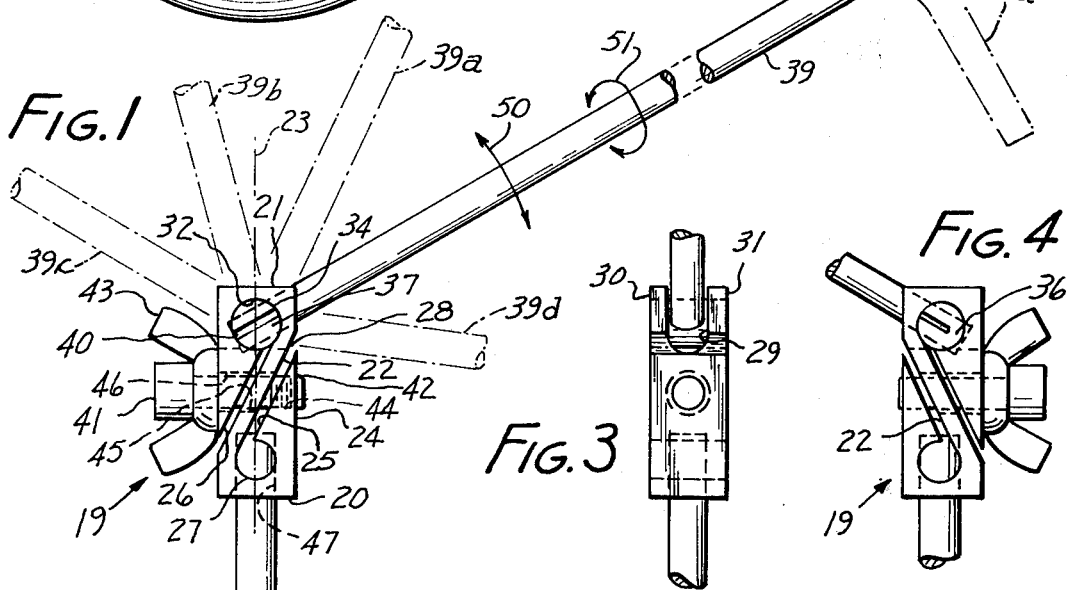
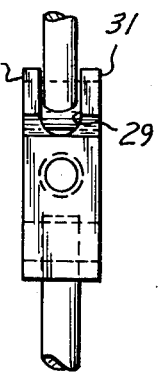
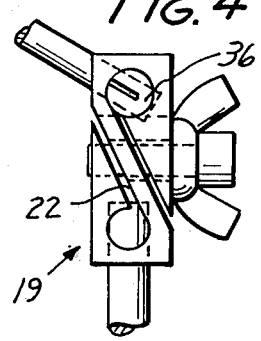
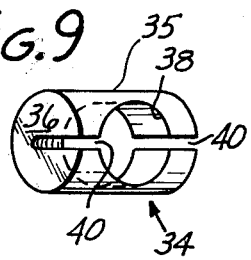
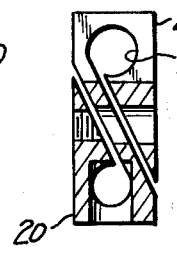
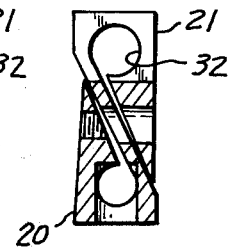
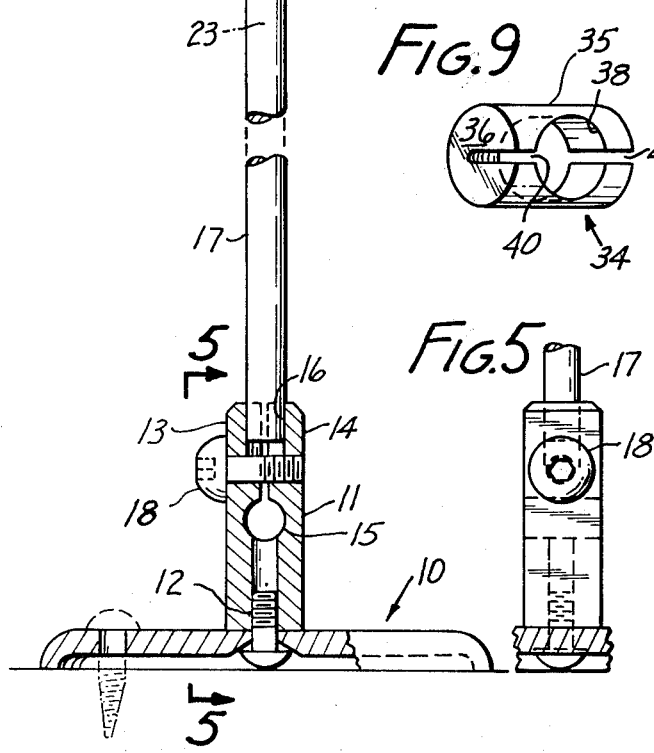
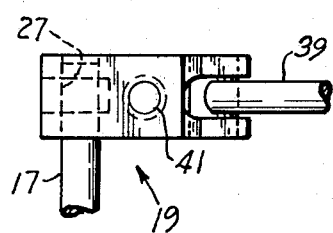

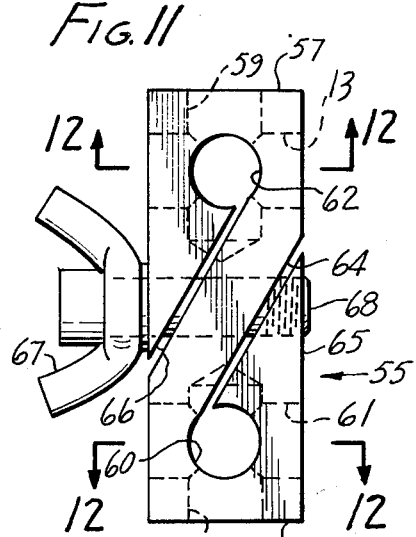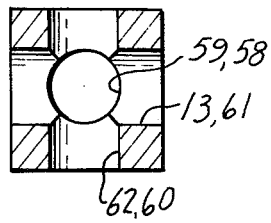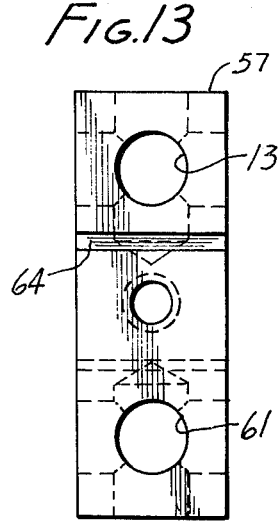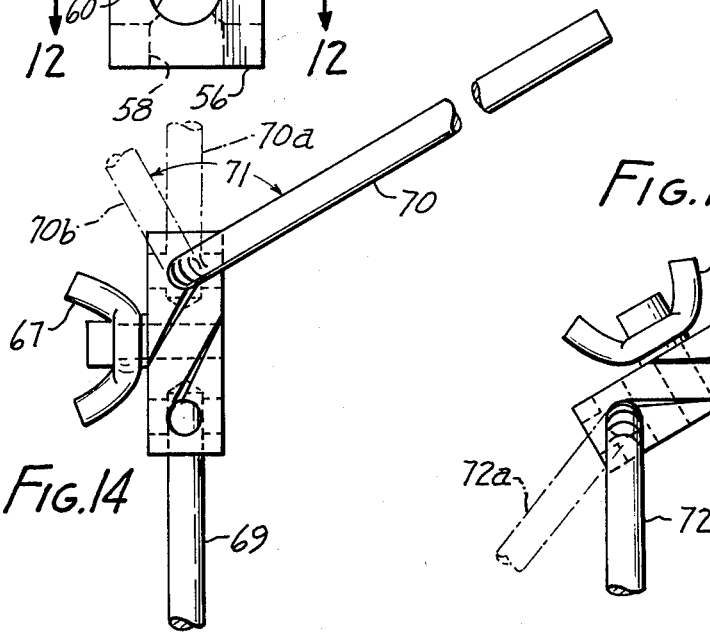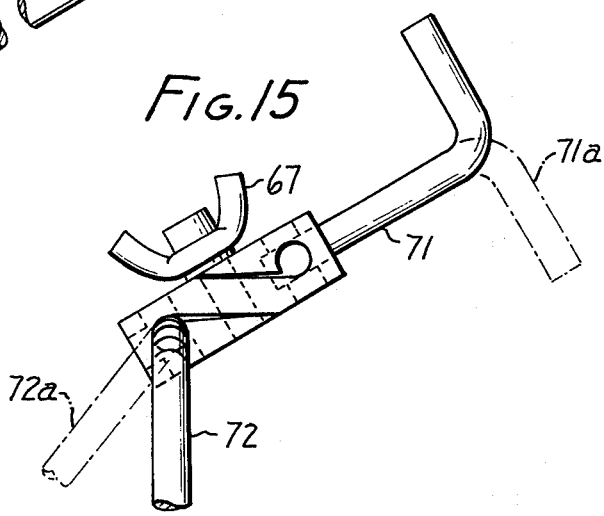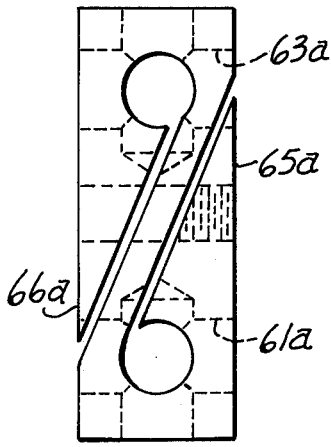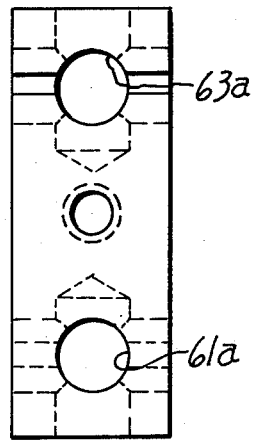

THREE DIMENSIONAL CLAMP DEVICE

This invention relates to clamping means and more particularly to three dimensional clamping means.

It is many times desirable to rigidly clamp members together in particular attitudes relative to each other. The desirability of doing this may be for any of a number of reasons, for example, for holding a member in a particular position or positions for working on. It is often desirable that the relative positions of such members be varied to positions which are not all in the same plane of the two members.

An object of this invention is to provide a simple clamp adapted to attach a plurality of members to each other in any of a number of relative positions including positions in various planes of the two members.

The invention is carried out by means of a clamping body having two opposed clamping sections joined by an obliquely extending intermediate section. A deformable hole or opening means at each clamping section performs a gripping action by which the clamping function is effected. A first of the clamping sections is adapted to clamp a member or members and the second of the clamping sections is adapted to clamp other of the members. Each of the two clamping sections has a tongue extending along the opposite sides of the intermediate section so that a clamping means can force the tongues closer together and toward the intermediate section to produce the clamping action on the clamped members at their respective ends of the clamp. In a preferred embodiment the clamping means comprises a screw passed through the tongues and the intermediate section.

In one embodiment the second clamping section contains a rotatable thimble for receiving the member to be clamped.

By reason of this clamp structure the members to be clamped can be moved relative to each other to many different positions and in different planes and at any particular relative adjustment, the clamp can be tightened to hold the members rigidly in that position.

The foregoing and other features of the invention will be better understood from the following detailed description and the accompanying drawing of which:

FIG. 1 shows, partly in cross-section, an arrangement mounted on a pedestal, of a pair of rod-like members connected by means of a clamp according to this invention, the clamping screw being in its unclamped condition;

FIG. 2 is a top view of the arrangement of FIG. 1;

FIG. 3 illustrates the clamp of FIG. 1 and the portions of the two rod-like members viewed from an angle 90° to that shown in FIG. 1;

FIG. 4 illustrates the clamp of FIG. 1 and the portions of the rod-like members adjacent thereto, viewed from an angle 180° from that shown in FIG. 1;

FIG. 5 is a cross-section view taken at line 5—5 of FIG. 1;

FIG. 6 is a top view of the clamp shown in FIG. 1 but without the inclusion of the thimble shown in FIG. 9;

FIG. 7 is a cross-section view taken at line 7—7 of FIG. 6;

FIG. 8 is a cross-section view taken at line 7—7 of FIG. 6, but differing from FIG. 7 in that in FIG. 8 the position of the clamp is illustrated after the clamping screw has been tightened to its clamping condition;

FIG. 9 is an isometric view of the thimble in the clamp of FIGS. 1 and 2;

FIG. 10 shows an arrangement including a clamp according to this invention, modified from the arrangement of FIG. 1;

FIG. 11 shows a side view of a modified form of clamp according to this invention;

FIG. 12 is a cross-section view taken at either of the lines 12—12 of FIG. 11;

FIG. 13 is a side view of the clamp of FIG. 11 looking at a face which is at 90° to the side appearing in FIG. 11;

FIG. 14 shows a pair of rods clamped in the clamp of FIGS. 11 to 13;

FIG. 15 shows another arrangement of a pair of rods clamped in the same clamp;

FIG. 16 is a side view of a clamp according to this invention modified somewhat from that shown in FIG. 11; and FIG. 17 is a side view of the clamp shown in FIG. 16 looking at a face turned at 90° to that shown in FIG. 16.

Referring to FIGS. 1–9 of the drawing there is shown a pedestal 10 which may be fastened to a table by screws or the like, to which there is attached an upstanding gripping member 11 in the form of a block, by means of a screw 12, the gripping member being bifurcated at its upper end to provide two slightly separated portions 13 and 14 extending upwardly from a cylindrical hole 15 passing through the grip 11 on a horizontal axis. At the upper end of the grip 11 there is a vertically extending cylindrical hole 16 adapted to receive the lower end of a rod-like member 17. The member 17 is securely gripped in this vertical position by a screw 18 passing through a hole through the bifurcated portion 13 and threaded into the other bifurcated portion 14 to draw these two portions together against the resilience of the material of portions 13 and 14 which will ordinarily be metal.

At the upper end of rod-like member 17 there is a clamp 19 constructed according to this invention. The clamp comprises a body of a generally square cross-section having two opposite clamping sections or portions, one of which, designated 20, is at the lower end of the clamp body and the other of which, designated 21, is at the upper end. These two end portions 20 and 21 are joined by an intermediate portion 22 which is in the form of a flat strip extending obliquely relative to the central vertical axis 23 from one side of the clamp portion 20 to the opposite side of the clamp portion 21. Clamp portion 20 has a tongue 24 extending upwardly and having a flat surface 25 parallel to, but slightly spaced from, the adjacent side of strip 22. Clamp portion 21 has a downwardly extending tongue 26 having a surface extending parallel to, and slightly spaced from, the adjacent surface of strip 22, leaving a slot 28a, so that the two tongues 24 and 26 are at opposite sides of the intermediate portion 22. The clamp body comprising portions 20, 21, 22, 24, 25 and 26 are of a unitary construction ordinarily of metal.

The lower clamp portion 20 has a bore 47 entering into it along the central axis 23 from the bottom end, into which there is fitted the upper end of member 17. The lower clamp portion 20 also has a hole 27 through it on an axis perpendicular to the central axis 23 intersecting bore 47 and is positioned so that the slot 28 between surface 25 and strip 22 opens into an upper part of this hole.

The upper clamping portion 21 is bifurcated by a channel 29 across it, forming two upstanding sides 30 and 31 spaced apart from each other, and through each bifurcated side there is a hole 32 and 33, these two holes being aligned to receive the ends of a thimble 34 which is shown separately in FIG. 9.

The thimble 34 has the form of a hollow cylindrical shell 35 having end walls 36 and 37 at its respective ends. A hole 38 dimensioned to receive the end of a second rod-like member 39 is formed through the cylindrical side wall of the thimble. A longitudinal slot 40 is formed in a plane through the longitudinal axis of the cylinder, through the side wall of the thimble and entirely through the end wall 37 (shown in FIG. 1), but not entirely through the other end wall 36, so that the thimble is a unitary integral structure. The slot has some width so that the diameter of the thimble can be reduced by squeezing the cylindrical wall of the thimble against the force of its natural resilience, to close up the slot. To permit this the thimble is made of a material, ordinarily metal, resiliently resistive to such deformation.

For the purpose of providing the clamping action there is provided a screw 41 having threads 42 at one end and wings 43 locked to the screw at the other end. The tongue portion 24 is provided with a threaded hole 44 to receive the threaded end of the screw and holes 45 and 46 aligned with the threaded hole 44 are formed through the intermediate section 22 and the tongue 26 in order that the screw may be passed through these portions of the clamp body. It is seen that when the wings 43 are turned in the direction to cause the screw to enter further to the right (with reference to FIG. 1) the two opposed tongues are moved toward each other against the force of the natural resilience of the material, and the widths of the slots 28 and 28a are reduced or eliminated. The material of the clamp body is resiliently resistive to the deformation so that the slots will reappear in their original widths when the screw 41 is backed away from its clamping condition. But when the screw is turned to its clamping condition the effect will be to reduce the diameter of hole 32 so that the diameter of the thimble 34 will correspondingly be reduced, which will reduce the diameter of hole 38 through the thimble, thus binding the rod element 39 in whatever position it is at the time of the clamping. At the same time the diameter of hole 27 will be resiliently reduced and the bore 47 will be resiliently deformed, causing binding of the clamp on the rod-like element 17. Thus the entire structure will be rigid and the two members 17 and 39 will be rigidly maintained in the relative positions which they had prior to the clamping.

From the foregoing description it is seen that the two rod-like members 39 may be rigidly positioned to assume any of various positions relative to each other. Thus in FIG. 1 there are shown a number of different attitudes for the member 39, in the phantom lines 39a, 39b, 39c and 39d, which is done by pivoting the member 39 to any of these positions as indicated by arrow 50, in a single plane, which in the case illustrated is the plane of the drawing. This pivoting will be done, of course, while the clamp is loosened so that the thimble 34 can turn within the holes 32 and 33. In this loosened condition of the clamp, the member 39 can also be rotated within hole 38 of the thimble to assume any of a number of different angular positions as indicated by arrow 51. This rotation of member 39 is illustrated by the turning of an outer hooked portion 53 from its position shown in full lines in FIG. 1 to the position 53a shown in phantom. A different adjustment can be made by rotating the clamp 19 relative to member 17 while the clamp is in its loosened condition. This will permit a relative swinging of member 39 about the axis 23 as indicated by arrow 52. Since the members 17 and 39 can be made to lie in any of various different planes, the device constitutes a three-dimensional clamp. When the desired relative positions of the two members 17 and 39 are thus obtained while the clamp is loosened, the clamp will then be tightened to hold these relative positions rigidly.

FIG. 10 illustrates an arrangement somewhat modified from that shown in FIG. 1. In FIG. 10 the rod 17 is removed from the bore 47 of claim 19 and instead is inserted into hole 27 of the clamp, while rod 39 remains in the thimble as in FIG. 1. This will permit the rod 39 and its hooked end 53 to move in planes different from those indicated by arrows 50 and 51. In the arrangement of FIG. 10 the longitudinal axis of the clamp 19 will not coincide with the longitudinal axis of rod 17 as in FIG. 1, but instead will be perpendicular to the longitudinal axis of rod 17.

It will be understood that the showing of members 17 and 39 as rods of circular cross-section is symbolic, as these members 17 and 39 may be elements of various shapes as represented symbolically by the hooked portion 53 at the free end of member 39. There will only be the requirement that the ends of members 17 and 39 should fit within the respective bore 47 or hole 27 (preferably both bore 47 and hole 27) and thimble hole 38.

FIGS. 11, 12 and 13 illustrate a modified form of clamp body 55 somewhat similar to clamp 19 of FIGS. 1 – 4, but differing from the clamp of FIGS. 1 – 4 in having no thimble such as the thimble 34 shown in FIG. 9. In the clamp of FIGS. 11 – 13 the lower section 56 of the clamp is similar to its upper section 57. The lower portion has a bore 58 and the upper portion a bore 59 co-axial with the central axis of the clamp. The lower section has mutually perpendicular holes 60 and 61 through it intersecting each other and also intersecting the bore 58. The upper section 57 similarly is provided with mutually perpendicular holes 62 and 63 intersecting each other and also intersecting the bore 59. The lower and upper sections 56 and 57 are joined by an intermediate section in the form of an oblique strip 64 in a manner similar to the position of oblique strip 22 in FIG. 1. Tongues 65 and 66 extend from the lower and upper sections in a manner similar to the tongues 24 and 26 of FIG. 1, the oblique inner sides of the respective tongues being spaced somewhat from the oblique intermediate strip 64.

Use of the clamp of FIGS. 11 – 13 is illustrated in FIGS. 14 and 15. It is seen that a rod may be inserted into any one or more of the three openings (the intersecting bore and two holes) at each end of the clamp, and clamped in position by action of the wing 67 on the screw 68 threaded into the screw hole in a manner similar to the arrangement in FIG. 1. In FIG. 14 there is illustrated a rod 69 inserted into the bore 58 of the lower clamp portion and another rod 70 having a bend at its end which engages the clamp so that this bent end is inserted through hole 62 of the upper clamp portion. With these two rods in the position illustrated, tightening the screw by use of the wing 67 pulls the tongues towards each other in the manner described in connection with the embodiment of FIGS. 1 to 3, which has the effect of producing a dimensional contraction or distortion of each of the bores and holes intersecting the bores. Regardless of which hole or bore a rod is inserted into, the clamping action will bind the rod therein so that it cannot be pulled out or turned. It is also recognized that the bent rod 70 may be rotated to any desired position as indicated by arrow 71 so that it may be bound by the screw in some other position than that illustrated in FIG. 14, for example the positions 70a or 70b shown in phantom.

FIG. 15 illustrates an arrangement of rods at the clamp somewhat different from that shown in FIG. 14. In FIG. 15 a rod 71 which may or may not be bent, as may be desired, is inserted into the upper bore 59 and a bent rod 72 has its bent end inserted into hole 60 of the clamp. It is recognized that the rod 72 or some other rod may, if desired, be inserted into hole 61 of the clamp. The rods 71 and 72 may be rotated within the respective bore or hole prior to clamping. For example the rod 71 may be placed in a position of rotation as shown in phantom at 71a and the rod 72a may likewise be rotated to some other position such as that shown at 72a in phantom prior to clamping.

FIGS. 16 and 17 show a clamp similar to that shown in FIGS. 11, 12 and 13 but differing in that the transverse holes 61a and 63a through the respective lower and upper portions of the clamp, corresponding to holes 61 and 63 of FIGS. 11 to 13, are positioned so that hole 61a reaches and is developed through the tip of tongue 66a (which corresponds to tongue 66) and hole 63a reaches and is developed through the tip of tongue 65a (which corresponds with tongue 65). This form may give additional locking action as compared with the previously described embodiments.

As in the case of the embodiments of FIGS. 1–10, the rod-like elements may be merely symbolic of members of other forms. Furthermore, the use of a pedestal as illustrated in FIG. 1 is not essential.

It will be understood that the embodiments of the invention illustrated and described herein are given by way of illustration and not of limitation, and that modifications or equivalents or alternatives within the scope of the invention may suggest themselves to those skilled in the art.

I claim:

1. A clamp for holding at least two rod-like members at various angles to each other comprising:
    a body having two opposed clamping sections and an intermediate section joining said clamping sections;
    a first of said clamping sections having at least one opening extending at least part way through it and having a tongue extending from the opening;
    the second of said clamping sections having at least two intersecting openings extending at least part way through it and having a tongue extending from said openings;
    the tongue of the first of said clamping sections having a surface which extends alongside of, and normally spaced from, one side of said intermediate section;
    the tongue of the second of said clamping sections having a surface which extends alongside of, and normally spaced from, the other side of said intermediate section;
    each of said openings being adapted to have inserted into it one of said rod-like members;
    clamping means attached to said tongues to resiliently draw said tongues toward each other and toward the intermediate section;
    whereby the cross-section areas of said openings are resiliently reduced, and the rod-like members are thereby gripped to prevent their movement relative to each other.

2. A clamp according to claim 1 in which the two clamping sections are aligned along a longitudinal axis.

3. A clamp according to claim 2 in which the intermediate section is oblique to the longitudinal axis.

4. A clamp according to claim 2 in which an opening of at least one of said clamping sections extends transverse to the axis and completely through the respective clamping section.

5. A clamp according to claim 4 in which an opening of each clamping section extends parallel to an opening of the other.

6. A clamp according to claim 4 in which each clamping section has an outer end at a position remote from the other clamping section, and at least one of the clamping sections has a hole extending from its outer end at least far enough to intersect another opening of said one clamping section.

7. A clamp according to claim 1 in which said surfaces of said tongues normally extend parallel to the respective adjacent sides of the intermediate section.

8. A clamp according to claim 1 in which each clamping section has an outer end at a position remote from the other clamping section, and an opening of at least one of said clamping sections is a hole extending from its outer end to its opening into which a rod-like member may be inserted.

9. A clamp according to claim 1 in which said clamping means comprises a screw extending through both of said tongues and said intermediate section.

10. A clamp according to claim 2 in which said clamping means comprises a screw extending transverse to said axis.

11. A clamp for holding at least two rod-like members at various angles to each other comprising:
    a body having two opposed clamping sections and an intermediate section joining said clamping sections;
    each of said clamping sections having an outer end, each outer end being located at a position of its clamping section which is remote from the other clamping section;
    each of said clamping sections having at least one opening extending at least part way through it and having a tongue extending from the respective opening;
    the tongue of a first of said clamping sections having a surface which extends alongside of, and normally spaced from, one side of said intermediate section;
    the tongue of the second of said clamping sections having a surface which extends along side of, and normally spaced from, the other side of said intermediate section;
    the first of said clamping sections having a channel extending from its outer end to a location which includes its said opening so that said outer end is bifurcated to a location which includes its said opening;
    a resiliently compressible thimble through said opening of said first clamping section, said thimble having opening means extending from its interior to its exterior into which a rod-like member may be inserted;

the said opening of the second clamping section being adapted to have inserted into it another of said rod-like members; and clamping means attached to said tongues to resiliently draw said tongues toward each other and toward the intermediate section;

whereby the cross-section area of each of the said openings of the first and second clamping section is resiliently reduced, thereby reducing the area of the opening means of the thimble, and the rod-like members are thereby gripped to prevent their movement relative to each other.

12. A clamp according to claim 11 in which the thimble is hollow except for its ends within the body opening of said second section.

13. A clamp according to claim 11 in which said thimble is hollow and has a wall which is slotted leaving a space between abutting ends of said wall so that said abutting ends can be forced together, thereby reducing the cross-section area of said thimble.

14. A clamp according to claim 11 in which the two clamping sections are aligned along a longitudinal axis and said thimble opening means extends in a direction transverse to said axis.

* * * * *